(12) United States Patent
Kreb et al.

(10) Patent No.: US 7,512,727 B2
(45) Date of Patent: Mar. 31, 2009

(54) REDUNDANT CONTROL SYSTEM HAVING A PERIPHERAL UNIT FOR AN AUTOMATION DEVICE

(75) Inventors: Walter Kreb, Schwanheim (DE); Ulrich Lehmann, Wörth (DE); Robert Schwab, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 213 days.

(21) Appl. No.: 11/660,225

(22) PCT Filed: Aug. 15, 2005

(86) PCT No.: PCT/EP2005/054001

§ 371 (c)(1),
(2), (4) Date: Feb. 15, 2007

(87) PCT Pub. No.: WO2006/018426

PCT Pub. Date: Feb. 23, 2006

(65) Prior Publication Data

US 2008/0098136 A1   Apr. 24, 2008

(30) Foreign Application Priority Data

Aug. 16, 2004   (DE) ...................... 10 2004 039 698

(51) Int. Cl.
*G06F 13/12* (2006.01)
*G06F 3/00* (2006.01)

(52) U.S. Cl. ............................ 710/69; 710/1; 710/12; 710/15; 710/70; 710/100; 714/11; 714/30; 714/47

(58) Field of Classification Search ............ 710/1, 710/12, 69, 70, 100; 714/11, 30, 47
See application file for complete search history.

(56) References Cited

U.S. PATENT DOCUMENTS

| 4,752,886 A | 6/1988 | Gareis |
| 4,870,564 A | 9/1989 | Ketelhut et al. |
| 5,613,064 A * | 3/1997 | Curtin .......................... 714/47 |
| 6,122,686 A * | 9/2000 | Barthel et al. ............... 710/100 |

FOREIGN PATENT DOCUMENTS

| DE | 44 15 541 A1 | 11/1994 |
| DE | 44 40 280 A1 | 5/1996 |
| EP | 0 546 855 A1 | 6/1993 |

* cited by examiner

*Primary Examiner*—Tammara Peyton

(57) ABSTRACT

There is described a periphery unit for an automatic device, which can be actuated as an analog input and as an analog output. A number of connections which are to be used as inputs and the number of connections which are to be used as outputs can be adapted in a flexible manner on the respective application from a predetermined number of connections of the periphery unit. As a result, a redundant automatic device wherein said types of periphery units can be used, is provided.

9 Claims, 5 Drawing Sheets

REDUNDANT CONTROL SYSTEM HAVING A PERIPHERAL UNIT FOR AN AUTOMATION DEVICE

CROSS REFERENCE TO RELATED APPLICATIONS

This application is the US National Stage of International Application No. PCT/EP2005/054001, filed Aug. 15, 2005 and claims the benefit thereof. The International Application claims the benefits of German application No. 10 2004 039 698.1 DE filed Aug. 16, 2004, both of the applications are incorporated by reference herein in their entirety.

FIELD OF INVENTION

The invention relates to a peripheral unit for an automation device. The invention relates further to a redundant automation device in which said type of peripheral units can be used.

BACKGROUND OF INVENTION

It is customary in automation technology for data to be exchanged between a peripheral unit of an automation device and a sensor, for example a sensor for measuring a temperature or pressure, or an actuator, for example an actuator in the form of a positioner for control valves, via analog current signals in the 0-20 mA or, as the case may be, 4-20 mA range. For this purpose the automation device has peripheral units which are provided with a pre-specified number of analog inputs and analog outputs, with said peripheral units exhibiting corresponding internally specified hardware properties so they can be used as an analog-input or analog-output unit. Peripheral units of said type that can also be used in redundant automation devices are known from Siemens Catalog ST 70, Sections 1 and 5, 2003 edition. Redundant automation devices, for example the SIMATIC S7-400H automation devices known from said catalog, are employed in areas of automation technology in which more stringent than usual demands are placed on the automation system's availability and hence fault tolerance. These are areas in which a system stoppage would have a very costly impact. Only redundant systems can here meet the demands placed on availability. The highly available SIMATIC S7-400H will continue operating even if parts of the control have failed due to one or more faults. It has redundantly configured centralized functions and is constructed having two separate central devices as control computers. Said two control computers process the same processing programs cyclically and synchronously. They monitor each other and independently determine which control computer is active, which is to say actually controls the process via its output data. For this purpose data is exchanged between the two control computers via a redundancy coupling. Redundantly embodied non-centralized peripheral units into which digital input/output modules are plugged depending on the individual application are in each case connected to the two control computers by means of a field bus. Process input information obtained with the aid of measuring transducers or encoders is forwarded by the peripheral unit to both control computers. In what is termed "hot standby" mode both control computers process the same control program simultaneously in the absence of any faults, though only one control computer is active, which is to say only one control computer's output data is further processed for controlling the process. In the event of a fault the intact device will assume sole control of the process. The devices are for that purpose automatically given the same application program, the same data components, the same process image contents, and the same internal data such as, for instance, times, counters, flags etc. This ensures that both devices are always up-to-date and can, in the event of a fault, each continue performing the controlling function alone. Although process output data, by which the signals requiring to be fed out by the peripheral unit to the actuators are pre-specified, is offered to the peripheral unit via both field buses when there are no faults, it only evaluates the control data received from one of the field buses. The respectively connected control computer can thus be designated as being the active control computer.

SUMMARY OF INVENTION

An object of the invention is to provide a peripheral unit of the type mentioned in the introduction that can be operated both as an analog input and as an analog output, with its being possible to, from a pre-specified number of terminals of the peripheral unit, flexibly accommodate the number of terminals to be used as inputs and the number of terminals to be used as outputs to the respective application. Further to be disclosed is a redundant automation device in which peripheral units of said type can be used.

Said object is achieved in terms of the peripheral unit by means of a peripheral unit having a control unit by which a supply unit can be switched to a first and to a second setting, wherein in the first setting a digital-to-analog converter can be controlled by the control unit at a constant value, as a result of which a constant voltage is applied to a measuring transducer that can be connected to a first terminal of the peripheral unit, in the second setting the digital-to-analog converter can be controlled by the control unit at a value corresponding to a process output signal requiring to be fed out that is routed to an actuator that can be connected to the first terminal of the peripheral unit, in the first setting a current applied by the measuring transducer can be routed to an analog-to-digital converter, which current the analog-to-digital converter routes to the control unit in the form of a process input signal corresponding to the applied current, with its being possible for the applied current to be registered by at least one measuring circuit.

Said object is achieved in terms of the redundant automation device by means of the measures described in claim 5.

It is advantageous that the terminals of the peripheral unit can be matched both for the analog input (reading in of sensor signals) and for the analog output (feeding out of actuator signals). The peripheral unit is suitable particularly for HART communication between the peripheral unit and actuator or, as the case may be, sensor. While said communication is taking place, during output the control unit conveys to the digital-to-analog converter a HART signal that comprises a digital communication signal and a digital process output signal requiring to be fed out and from which the digital-to-analog converter generates an analog signal. Said analog signal comprises an analog process signal and an analog communication signal comprising two frequencies (1200 Hz, 2200 Hz). During input the analog-to-digital converter conveys to the control unit a digital signal from which the control unit filters the bit information 0 and 1 corresponding to the two frequencies, and the digital process values.

In an embodiment of the invention the control unit's first and second setting can be set by a user aided by menu prompting, as a result of which the user is able to arrange for the peripheral unit's terminals to be inputs or outputs in accordance with his or her particular application. It is possible, for example, to operate ten terminals of a sixteen-terminal peripheral unit as inputs for connecting measuring transducers and eight terminals as outputs for connecting actuators. In that case a constant voltage will be applied to the measuring transducers connected to the ten input terminals and a current corresponding to a process signal requiring to be fed out will be routed to the connected actuators via the eight output terminals.

In a further embodiment of the invention it is provided that in the second setting the value corresponding to the process output signal requiring to be fed out will be routed back to the analog-to-digital converter. That makes it possible to detect a break in a lead via which an actuator is connected to an output terminal of the peripheral unit.

In an embodiment of the invention according to the measures described in claim 4, the peripheral unit can be operated in a non-redundant or redundant mode.

The load resistance is constant for the analog input both in the redundant and in the non-redundant mode. The load resistance is formed in the non-redundant mode by series-connected measuring resistors of two measuring circuits of the peripheral unit. In the redundant mode a measuring circuit of one peripheral unit is connected in series to another peripheral unit's measuring circuit.

BRIEF DESCRIPTION OF THE DRAWINGS

The invention and its embodiments and advantages are explained in more detail below with reference to the drawing in which an exemplary embodiment of the invention is illustrated.

Identical parts shown in the figures have been assigned the same reference numerals/letters.

DETAILED DESCRIPTION OF INVENTION

Figure 1:
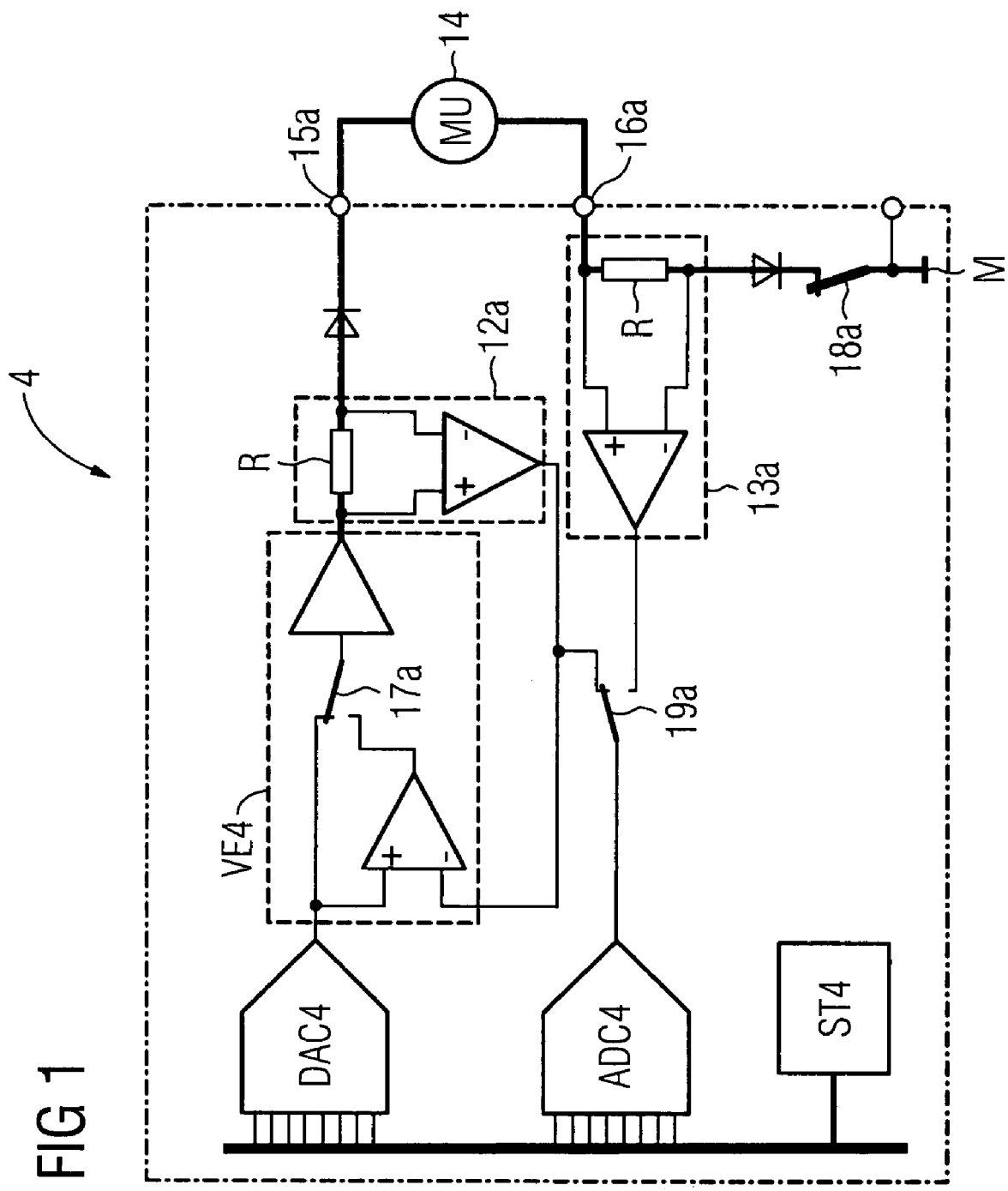
FIGS. 1 and 2 are block diagrams of non-redundantly switched peripheral units.

Designated DAC4 in FIG. 1 is a digital-to-analog converter of a non-redundantly switched peripheral unit 4, which converter is connected via a bus to a control unit ST4 and an analog-to-digital converter ADC4. Via a control lead (not shown here), the control unit ST4 switches a first switch 17*a* in such a way that a supply unit VE4 can be switched to a first and to a second setting. In the example shown, the first switch 17*a* is in a switch position as a result of which a constant voltage is applied to a measuring transducer 14 connected to terminals 15*a*, 16*a* of the peripheral unit 4. The supply unit VE4 generates said voltage from an output variable of the digital-to-analog converter DAC4, which variable the digital-to-analog converter DAC4 forms from a value routed to it by the control unit ST4. In this setting the terminal 15*a* of the peripheral unit 4 is assigned as an analog input terminal (reading in of a measuring transducer signal). Owing to a process variable requiring to be measured (a temperature, for instance) from the measuring transducer 14 and on the prespecified constant voltage, a measured current flows via a first and second measuring circuit 12*a*, 13*a* and a second switch 18*a*, which can be controlled by the control unit ST4, to a frame potential M (the flow of current is indicated by a thick line). The measuring circuits 12*a*, 13*a* each have a measuring resistor R, with the said resistor's resistance value being half the load resistance. The measuring circuits 12*a*, 13*a* register the measured current, with the measured current registered by the measuring circuit 12*a* or measuring circuit 13*a* being routed in accordance with the position of a switch 19*a* to the analog-to-digital converter ADC4, which conveys a process value corresponding to said measured current to the control unit ST4. In the example shown, the measured current registered by the measuring circuit 12*a* is conveyed to the analog-to-digital converter ADC4.

Figure 2:
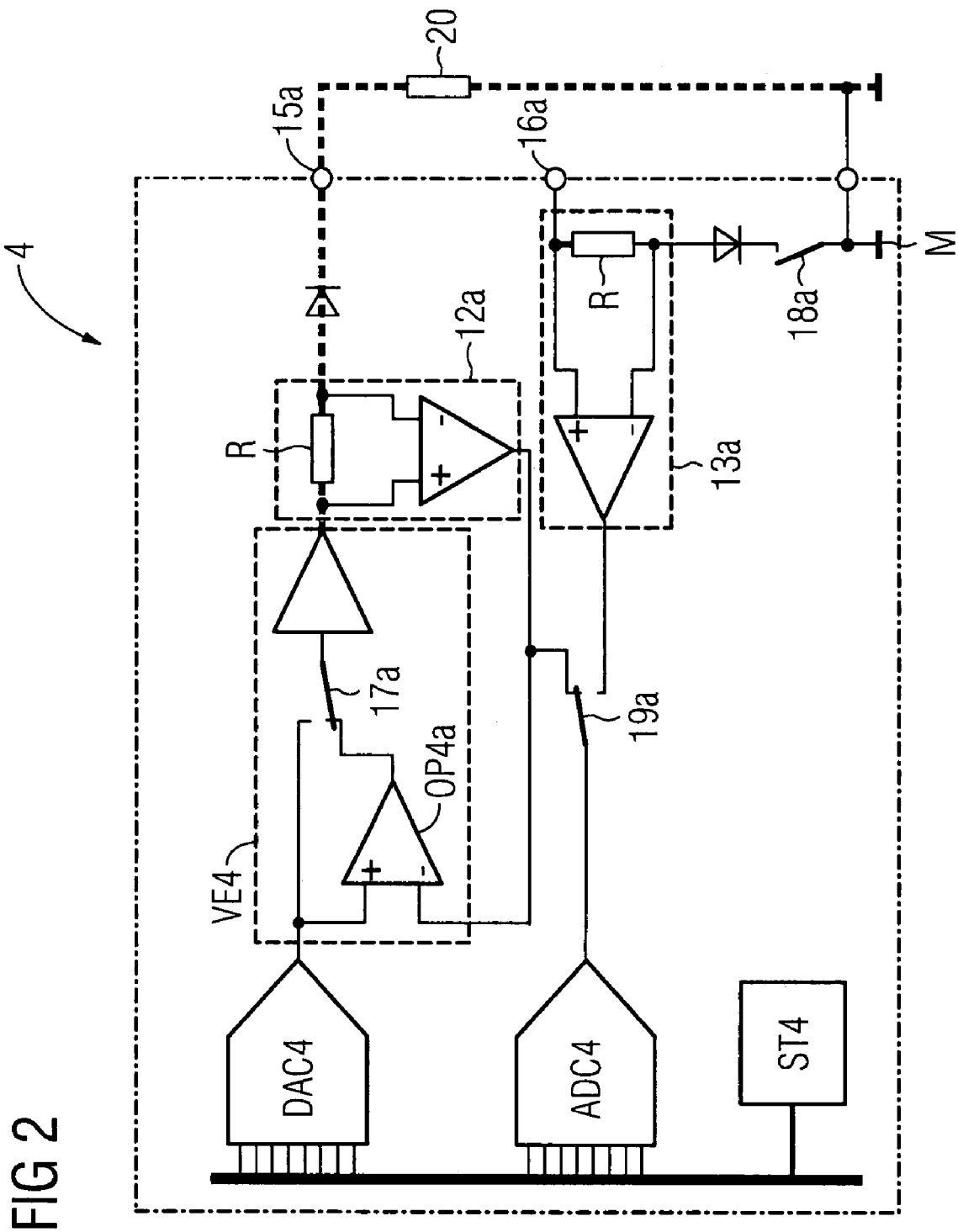

Reference is made in the following to FIG. 2. The peripheral unit 4 has therein been set as an analog output, with an actuator 20 being connected to the terminal 15*a*. Changing over from analog input to analog output or, as the case may be, from analog output to analog input takes place preferably in a menu-prompted manner as part of a configuration and parameterization process with the aid of an engineering system known per se, for example an engineering system known from Siemens Catalog PCS 7, Section 4, 2004 edition. For this purpose a user is provided with a corresponding menu, showing the peripheral unit's terminals, on a display unit connected to the bus. The terminals can be identified by, for example, different colors, with its being possible for terminals for analog inputs to be marked with a first color and terminals for analog outputs to be, marked with a second color. The control unit ST4 sets the terminals according to the marking. When the terminal 15*a* has been assigned as an analog output, the control unit ST4 will set the switch 17*a* of the supply unit VE4 to a position in which a current corresponding to a process output signal is conveyed to the actuator 20. From the process output signal of the control unit ST4 the digital-to-analog converter DAC4 first generates an analog value from which the supply unit VE4 derives a current. Said current is registered via the first measuring circuit 12*a* and kept at a constant value via an operational amplifier OP4*a* of the supply unit VE4. Said current is further routed via the switch 19*a* to the analog-to-digital converter ADC4, which conveys a digital value assigned to said current to the control unit ST4. Routing back of said kind enables the control unit ST4 to detect a break in the lead via which the actuator 20 is connected to the terminal 15*a*.

A redundant use of the peripheral unit 4 is explained in more detail below.

Figure 5:
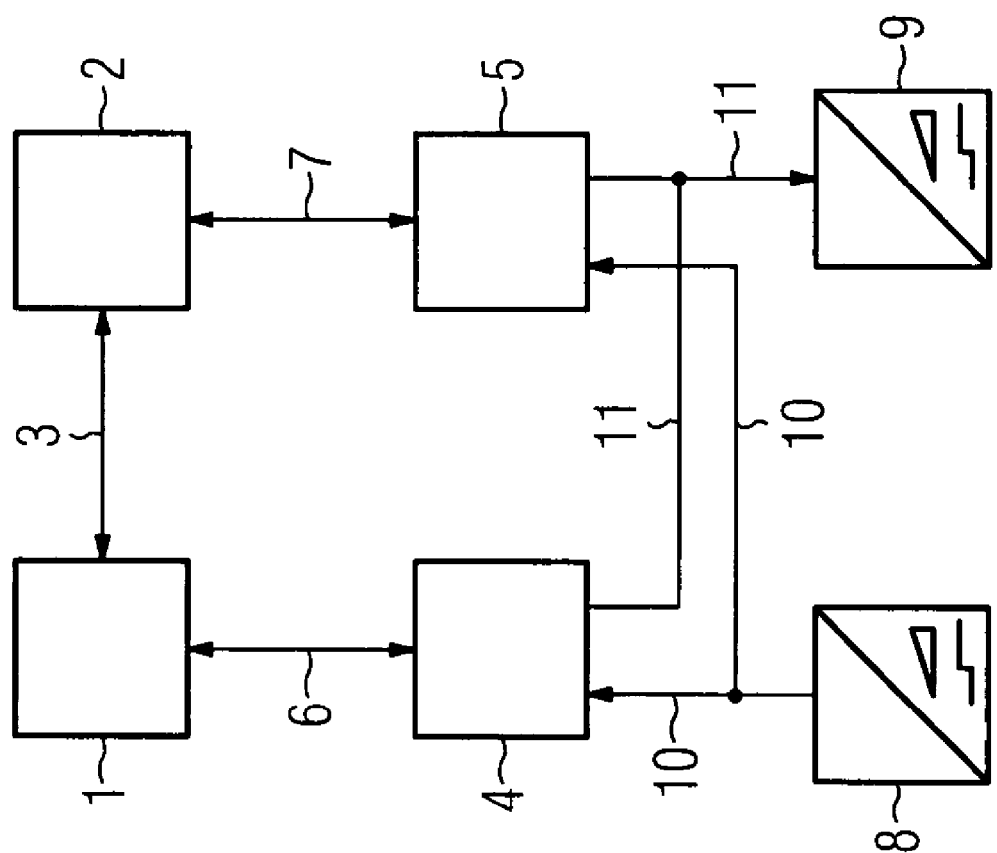
FIG. 5 shows a redundant automation system.

For this purpose reference is first made to FIG. 5, in which is shown a redundant automation device known per se. The redundant automation device is designed according to a 1-of-2 principle and comprises a first redundancy unit having a first control computer 1 as well as the peripheral unit 4 and a second redundancy unit having a second control computer 2 as well as a peripheral unit 5. Sensors 8, for example what are termed two-wire measuring transducers, register process signals of a technical process requiring to be controlled that are read in by the peripheral units 4, 5 via leads 10 and conveyed via suitable serial or parallel buses 6, 7 to the control computers 1, 2 in the form of digital signals. The control computers 1, 2 process said signals into corresponding control signals for actuators 20, with only one of the redundancy units conveying said control signals to the actuators 20 via a lead 11. The redundancy units operate in a master-standby mode, meaning that only one redundancy unit is switched to active whereas the other is switched to passive. Only the active redundancy unit controls the actuators 20 via its peripheral unit; the other redundancy unit conveys only a zero signal to its peripheral unit. For exchanging information in the form of, for example, status and adjustment information, a redundancy coupling 3 is provided via which the redundancy units are interconnected. If the active redundancy unit is not operating fault-free, the active redundancy unit will indicate the fault to the passive redundancy unit via the redundancy coupling 3, as a result of which the currently passive redundancy unit will change over to the active operating mode, which is to say that said redundancy unit will be switched to active and assume the master mode; the currently active redundancy unit will, conversely, be switched to passive and change over to standby mode. A change in master status must take place in such a manner that the control signals are conveyed to the actuators substantially continuously and as far as possible with no signal breaks. It must furthermore be made certain that continuous measuring of the process signals has been insured while a peripheral unit 4, 5 is being replaced for repairs to be made. A measured current that is applied by a two-wire measuring transducer to the peripheral units 4, 5, and is dependent on a variable requiring to be registered, for example a variable in the form of a temperature or pressure, must, if, say, the peripheral unit 4 has failed, be registered by the peripheral unit 5 in order to realize fault-free processor controlling.

Figure 3:
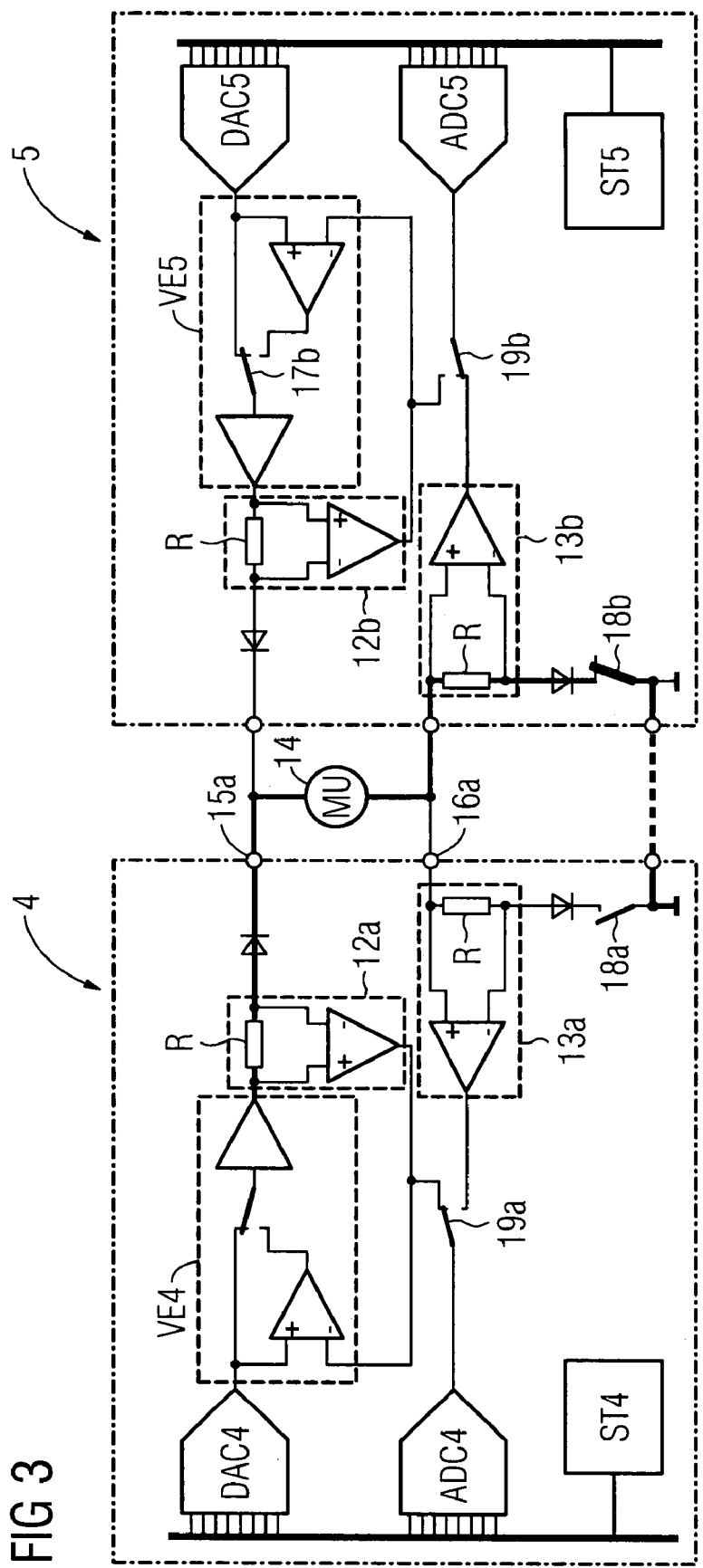
FIGS. 3 and 4 are block diagrams of redundantly switched peripheral units.

Reference is made in this connection to FIG. 3, in which is shown an interconnection of two redundant peripheral units.

It is first assumed that the redundantly configured peripheral units 4, 5 have been assigned parameters or, as the case may be, have been set in such a way that said units have been provided for an analog input (reading in of sensor signals).

The manner in which the peripheral unit 5 functions and operates corresponds to the manner in which the peripheral unit 4 functions and operates as described in FIGS. 1 and 2, with the parts of the peripheral unit 4 assigned the reference numerals/letters ST4, VE4, 12a, 13a . . . corresponding to the parts of the peripheral unit 5 assigned the reference numerals/letters ST5, VE5, 12b, 13b . . . .

A first redundant operating mode of the peripheral units 4, 5 operated as analog inputs is shown in the present example. The supply unit VE4 is therein controlled by the control unit ST4; the second switch 18b of the peripheral unit 5 is closed whereas the supply unit VE5 is not controlled and the second switch 18a of the peripheral unit 5 is open. The measured current will in that case be registered by the first measuring circuit 12a of the peripheral unit 4 and by the second measuring circuit 13b of the peripheral unit 5 (the flow of measured current is indicated by a thick line), with suitable operational amplifiers of said measuring circuits 12a, 13b measuring the voltage drop due to the measured current at the measuring resistor R and conveying a current corresponding to said drop via the controllable switches 19a, 19b to the analog-to-digital converters ADC4, ADC5, which route a digital value corresponding to said measured current to the control units VE4, VE5.

A further redundant operating mode of the peripheral units 4, 5 switched as an analog input can be realized by having the supply unit VE5 of the peripheral unit 5 controlled and the second switch 18a of the peripheral unit 4 closed, but the second switch 18b of the peripheral unit 5 open and the supply unit VE4 of the peripheral unit 4 not controlled. The measured current will in that case be registered by the first measuring circuit 12b of the peripheral unit 5 and by the second measuring circuit 13b of the peripheral unit 4, with the controllable switches 19a, 19b being switched accordingly in order to convey the measured current registered in the measuring circuits 12b, 13a to the analog-to-digital converters ADC4, ADC5.

If, for example, the peripheral unit 4 is faulty and has to be removed from the control system, the peripheral unit 5 will be switched to the non-redundant operating mode. The supply unit VE5 will in that case be controlled by the control unit ST5 and the switch 18b closed, as a result of which the measured current will flow via the resistor R of the first and second measuring circuit 12b, 13b of the peripheral unit 5. Conversely, the peripheral unit 4 will operate in the non-redundant mode if the peripheral unit 5 is removed from the control system. The supply unit VE4 of the peripheral unit 4 will be activated and the switch 18a in that case closed, as a result of which the measured current will flow via the resistor R of the first and second measuring circuit 12a, 13a of the peripheral unit 4.

Figure 4:
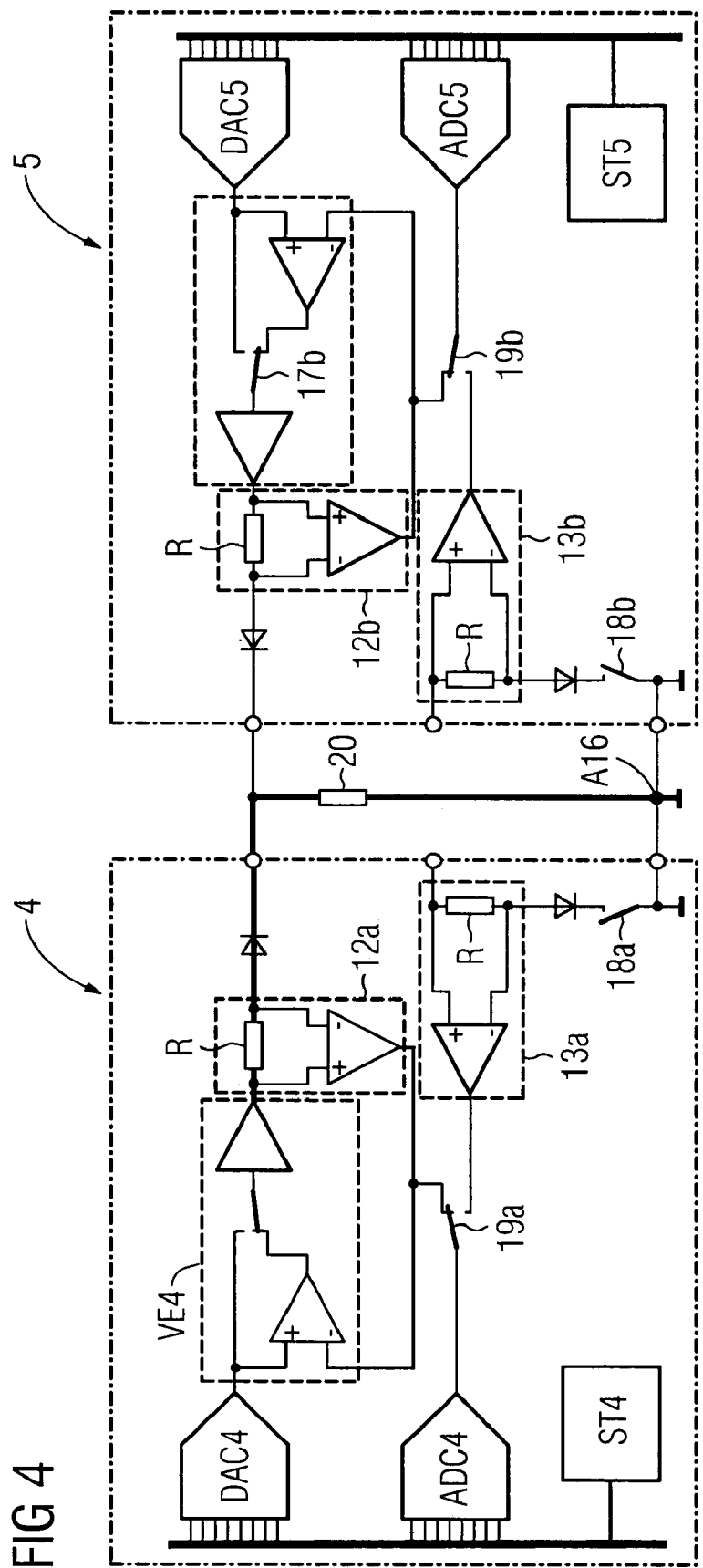

It is now assumed in the following that the redundantly configured peripheral units 4, 5 have been assigned parameters or, as the case may be, have been set in such a way that said units have been provided for an analog output (feeding out of actuator signals). Reference is made for this purpose to FIG. 4, in which is shown a further interconnection of the peripheral units 4, 5.

Owing to setting of the peripheral units 4, 5 as an analog output, an output current corresponding to a process output signal can be applied by the peripheral units 4, 5 to the actuator 20. The peripheral units 4, 5 are switched to the redundant mode as a function of a control signal. The supply unit VE4 of the peripheral unit 4 can therein be activated with a view to the output of a constant current and the current switched via the first measuring circuit 12a to the first terminal 15a, 15b of the actuator 20, whose second terminal A16 is connected to the frame potential M. For example a high level of said control signal will cause the supply unit VE4 of the peripheral unit 4 to be activated and the supply unit VE5 of the peripheral unit to be deactivated, as a result of which the output current will flow via the first measuring circuit 12a of the peripheral unit 4 and via the actuator 20 to the frame potential.

A low level of said control signal will, by contrast, cause the supply unit VE4 of the peripheral unit 4 to be deactivated and the supply unit VE5 of the peripheral unit to be activated, as a result of which the output current will flow via the first measuring circuit 12b of the peripheral unit 5 and via the actuator 20 to the frame potential.

If, for example, the peripheral unit 5 is faulty and has to be removed from the automation system, the peripheral unit 4 will be switched to the non-redundant operating mode. The supply unit VE4 will in that case be activated, as a result of which the output current will flow via the resistor R of the first measuring circuit 12a of the peripheral unit 4 and via the actuator 20 to the frame potential M. Conversely, the peripheral unit 5 will operate in the non-redundant mode if the peripheral unit 4 is removed from the control system. The supply unit VE5 will in that case be activated, as a result of which the output current will flow via the resistor R of the first measuring circuit 12b of the peripheral unit 5 and via the actuator 20 to the frame potential M.

The invention claimed is:

1. A peripheral unit for an automation device, comprising:
a first terminal;
a second terminal;
a supply unit;
a digital-to-analog converter;
a control unit to switch the supply unit to a first and to a second setting wherein:
in the first setting the digital-to-analog converter is controlled by the control unit at a constant value to apply a constant voltage to the first terminal, and in the second setting the digital-to-analog converter is controlled by the control unit at a value corresponding to a required process output signal at the first terminal; and an analog-to-digital converter to convert an applied current inputted via the first terminal in the first setting, wherein the analog-to-digital converter applies a process input signal to the control unit based upon the measured applied current which is measured via a measuring circuit.

2. The peripheral unit as claimed in claim 1, wherein a measuring transducer is connected to the first terminal if the supply unit is switched to the first setting.

3. The peripheral unit as claimed in claim 2, wherein a actuator is connected to the first terminal if the supply unit is switched to the second setting.

4. The peripheral unit as claimed in claim 1, wherein the first and second settings of the control unit are set by a user aided by menu prompting.

5. The peripheral unit as claimed in claim 3, wherein in the second setting the value corresponding to the process output signal is routed back to the analog-to-digital converter.

6. The peripheral unit as claimed in claim 1, wherein in the first setting the measuring circuit or a further measuring circuit registers the applied current in a redundant operating mode.

7. The peripheral unit as claimed in claim 1, wherein in the first setting the measuring circuit and a further measuring circuit register the applied current in a non redundant operating mode.

8. A redundant control system, comprising:
a peripheral unit for an automation device, having:
  a first terminal;
  a second terminal;
  a supply unit;
  a digital-to-analog converter;
  a control unit to switch the supply unit to a first and to a second setting wherein:
  in the first setting the digital-to-analog converter is controlled by the control unit at a constant value to apply a constant voltage to the first terminal, and
  in the second setting the digital-to-analog converter is controlled by the control unit at a value corresponding to a required process output signal at the first terminal; and
  an analog-to-digital converter to convert an applied current inputted via the first terminal in the first setting, wherein the analog-to-digital converter applies a process input signal to the control unit based upon the measured applied current which is measured via a measuring circuit; and
  an actor having a first actor terminal and a second actor terminal; wherein the first actor terminal is connected to the first terminal, and wherein the second actor terminal is connected to a terminal that is provided with a frame potential of the peripheral unit.

9. A redundant control system, comprising:
a peripheral unit for an automation device, having:
  a first terminal;
  a second terminal;
  a supply unit;
  a digital-to-analog converter;
  a control unit to switch the supply unit to a first and to a second setting wherein:
  in the first setting the digital-to-analog converter is controlled by the control unit at a constant value to apply a constant voltage to the first terminal,
  in the second setting the digital-to-analog converter is controlled by the control unit at a value corresponding to a required process output signal at the first terminal,
an analog-to-digital converter to convert an applied current inputted via the first terminal in the first setting, wherein the analog-to-digital converter applies a process input signal to the control unit based upon the measured applied current which is measured via a measuring circuit; and
a measuring transducer having a first measuring transducer terminal and a second measuring transducer terminal, wherein the first measuring transducer terminal is connected to the first terminal, and wherein the second measuring transducer terminal is connected to the second terminal and the second measuring circuit.

* * * * *